United States Patent [19]

Urata

[11] Patent Number: 4,689,695
[45] Date of Patent: Aug. 25, 1987

[54] VIDEO SIGNAL REPRODUCING APPARATUS

[75] Inventor: Kaoru Urata, Kanagawa, Japan

[73] Assignee: Sony Corporation, Tokyo, Japan

[21] Appl. No.: 810,095

[22] Filed: Dec. 18, 1985

[30] Foreign Application Priority Data

Dec. 29, 1984 [JP] Japan ................. 59-276826

[51] Int. Cl.⁴ .......................................... H04N 9/493
[52] U.S. Cl. .................................................. 358/314
[58] Field of Search ............... 358/314, 310, 327, 336, 358/340; 360/38.1

[56] References Cited

U.S. PATENT DOCUMENTS 4,628,369  12/1986  Ichinoi et al. ................. 358/314

Primary Examiner—Donald McElheny, Jr.
Attorney, Agent, or Firm—Lewis H. Eslinger; Alvin Sinderbrand

[57] ABSTRACT

A video signal reproducing apparatus for reproducing a video signal which is recorded by such a manner that a plurality of component signals forming a video signal are time-base-compressed, modulated and then recorded on a recording medium having a head reading the time-base-compressed component signals, a demodulator demodulating the read-out time-base-compressed component signals, a dropout detector detecting a dropout in the read-out time-base-compressed component signals and producing a dropout signal, an adder superimposing the dropout signal upon the demodulated time-base-compressed component signals, a time-base-expander expanding the time bases of the time-base-compressed component signals and that of the dropout signal derived from the adder and producing a plurality of component signals and a dropout signal the time bases of which are expanded to be the normal time bases, a dropout signal detector detecting the superimposed dropout signal from the plurality of time-base-expanded component signals, a signal compensator replacing the plurality of component signals by preceding component signals when the dropout signal is detected by the dropout signal detector, and a signal processor obtaining a reproduced video signal from the plurality of component signals passed through the signal compensator, wherein the dropout signal is time-base-expanded by the time-base-expander so as to become the ordinary time base same as that of the demodulated signal.

5 Claims, 25 Drawing Figures

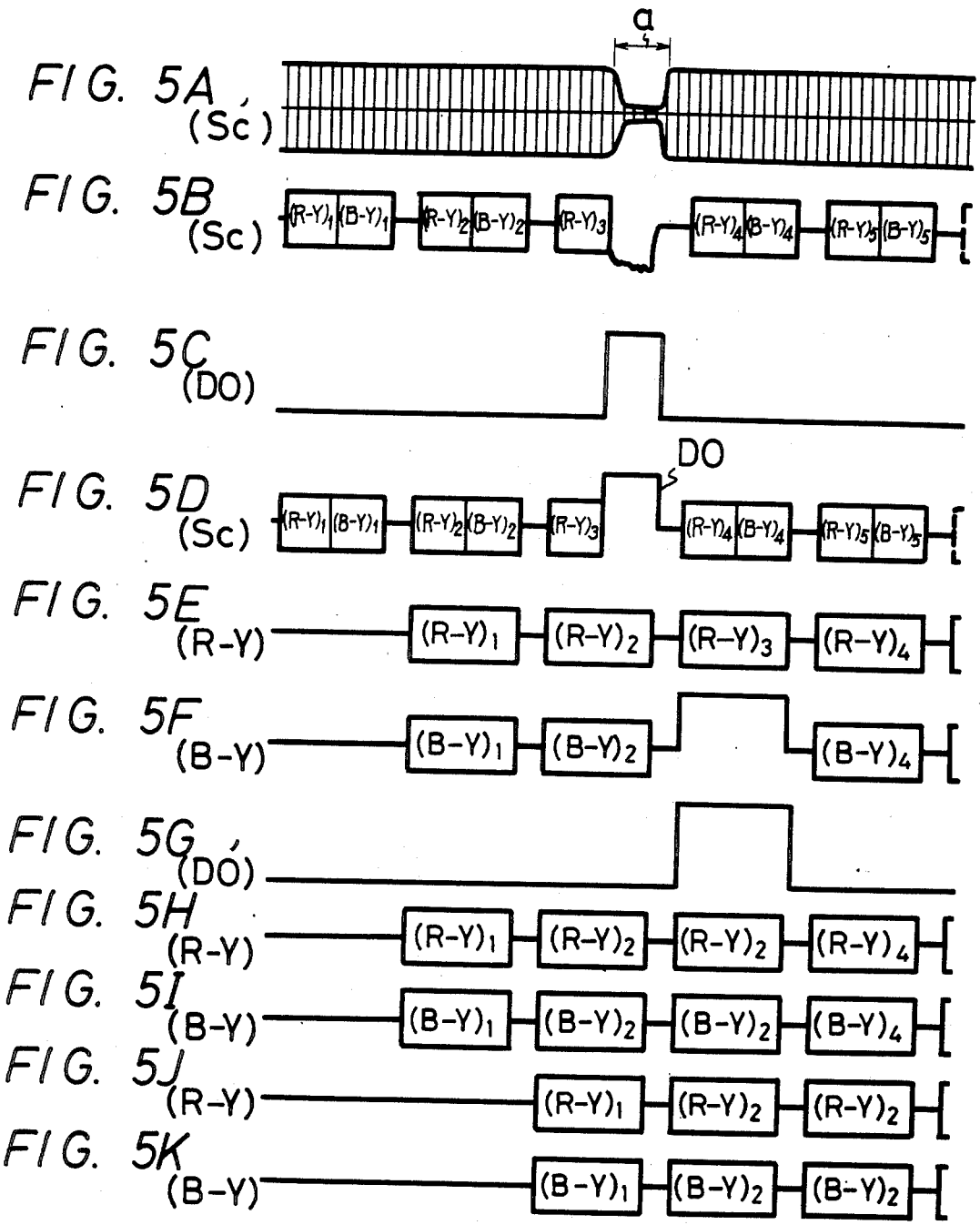

VIDEO SIGNAL REPRODUCING APPARATUS

BACKGROUND OF THE INVENTION

1. Field of the Invention

The present invention relates generally to a reproducing apparatus for reproducing a color video signal which is recorded in such a manner that a pair of component chrominance signals are time-base-compressed, time-division-multiplexed and then recorded on a track different from a track on which, for example, a luminance signal is recorded at the same time with the luminance signal. More particularly, this invention relates to a video signal reproducing apparatus in which a dropout compensation circuit system is simplified in circuit arrangement.

2. Description of the Prior Art

As a recording and reproducing apparatus such as a video with a camera integrally therewith and other recording and reproducing apparatus (VTR), there is proposed such a recording and reproducing system (see a published document of Japanese patent application unexamined No. 56-134891) in which a color video signal is separated into a luminance signal and a pair of component chrominance signals and they are then respectively recorded on different tracks. According to this recording and reproducing system, a pair of component chrominance signals, for example, a pair of color difference signals R−Y and B″Y are time-base-compressed to the half and time division multiplexed as shown in FIG. 1B and the time base-compressed chrominance signals (hereinafter referred to as compressed color difference signals) are recorded on the track adjacent to a recording track of a luminance signal Y.

FIG. 2 is a block diagram illustrating a practical example of a recording and reproducing apparatus which can realize such recording and reproducing system.

In FIG. 2, reference numeral 10R generally designates a recording system. This recording system 10R will be described first. Referring to FIG. 2, a luminance signal Y containing a horizontal synchronizing signal $P_H$ and applied to a terminal 1 is added with a first synchronizing signal (pulse) $P_Y$ used for matching the time between channels by an adder 2. As shown in FIG. 1A, the synchronizing pulse $P_Y$ is inserted into and added to, for example, the latter half portion of the horizontal synchronizing pulse $P_H$ with the polarity opposite to that of the synchronizing pulse $P_H$.

The reason why the synchronizing pulse $P_Y$ with the positive polarity is inserted into the latter half of the horizontal synchronizing pulse $P_H$ is to facilitate the synchronizing separation of the pulse $P_Y$ and to prevent a spurious to the low frequency band component of the luminance signal Y by the pulse $P_Y$ whereby to avoid the occurrence of moiré.

Reference $W_H$ denotes the pulse width of the pulse $P_H$ and, in this example the pulse width of the synchronizing pulse $P_Y$ is selected as $\frac{1}{2}W_H$.

The luminance signal $S_Y$ having the synchronizing pulse $P_Y$ inserted is frequency-modulated by an angular modulator, for example, an FM modulator 3 to be a frequency-modulated luminance signal $S_Y$ and then recorded on a magnetic medium, for example, a tape 4, in this example, by a head Ha.

On the other hand, the red and blue color difference signals R−Y and B−Y are time-base-compressed to the half by a time-base-compressor 5 and then time division multiplexed. The compressed signals R−Y and B−Y are added with a second synchronizing signal (pulse) Pc by an adder 6, forming a compressed color difference signal Sc shown in FIG. 1B.

In order for the second synchronizing pulse Pc to be used for matching the time between the channels, it is inserted into the compressed color difference signals R−Y and B−Y at the time position same as the time position at which the first synchronizing pulse $P_Y$ is inserted. In this example, the second synchronizing pulse Pc is inserted under being the state of the negative polarity.

The compressed color difference signal Sc is frequency-modulated by an FM modulator 7 to be a frequency-modulated color difference signal Sc′ and then recorded on the tape 4 by a head Hb. In this case, a recording track for the compressed color difference signals is formed so as to adjoin the recording track for the luminance signal $S_Y$.

Reference numeral 10P designates a reproducing system, in which the luminance signal $S_Y'$ reproduced by the head Ha is supplied through an amplifier 11 to a demodulator 12 and thereby frequency-demodulated.

In like manner, the compressed color difference signal Sc′ (shown in FIG. 3A) reproduced by the head Hb is supplied through an amplifier 13 to a demodulator 14 and thereby frequency-demodulated to be the signal Sc (FIG. 3B). The demodulated signal Sc is time-base-expanded twice by a time base expander 15 and a pair of color difference signals R−Y and B−Y are produced at the same timing. At that time, since the time base expander 15 is supplied with a read clock the time base of which is constant, the time base expander 15 generates the color difference signals R−Y and B−Y the reproduced jitter components of which are removed (FIGS. 3D and 3E).

The pair of color difference signals R−Y and B−Y are fed to a signal compensator circuit 20 which forms a dropout compensator circuit 16. The signal compensator circuit 20 is provided for the respective transmission systems of the pair of color difference signals R−Y and B−Y. In this example, the circuit 20 is formed of 1H (H is the horizontal period) delay circuits 21 ans 23 and switching circuits 22 and 24. The switching circuit 22 is supplied with the red color difference signal R−Y derived from the time base expander 15 and the output signal from the delay circuit 21, while the output signal from the switching circuit 22 is supplied to the delay circuit 21.

Similarly, the other switching circuit 24 is supplied with the blue color difference signal B−Y derived from the time base expander 15 and the output signal from the delay circuit 23, while the output signal from the switching circuit 24 is supplied to the delay circuit 23.

When a dropout occurs, the pair of switching circuits 22 and 24 are supplied with a switching pulse (dropout compensating pulse) which is used to replace the color difference signal with the dropout by the color difference signal before the same by 1H. To this end, the frequency modulated and compressed color difference signal Sc′ passed through the amplifier 13 is further supplied to a dropout detector circuit 17 which generates a dropout pulse DO shown in FIG. 3C, when it contains a dropout. The dropout pulse DO is supplied to a time base expander 18 in which the time base of the dropout pulse DO is expanded twice (FIG. 3F).

Since the time base expander 18 generates a dropout pulse corresponding to a dropout interval, if a dropout occurs in, for example, an interval a shown in FIG. 3A, only the blue color difference signal B−Y in the compressed color difference signal Sc' is dropped out, so that the time base expander 18 generates only a dropout compensating pulse $DO_B$ for the color difference signal B−Y.

Dropout compensating pulses $DO_R$ and $DO_B$ from the time base expander 18 are supplied through an OR circuit 19 to the pair of switching circuits 22 and 24 commonly, whereby the dropout is compensated for both the color difference signals, simultaneously (FIGS. 3G and 3H).

The reason why the red color difference signal R−Y is also simultaneously compensated for even when the dropout occurs in only the blue color difference signal B−Y will be described. That is, if the red color difference signal R−Y is not compensated for by the color difference signal on the same horizontal line but only the blue color difference signal B−Y is compensated for by the blue color difference signal B−Y 1H preceding, color display is carried out by color difference signals of different horizontal lines and hence there is then a fear that depending on the picture images, a hue is disturbed and accordingly the quality of picture will be deteriorated.

A reproducing apparatus in which a pair of color difference signals are both compensated for simultaneously has already been proposed by the assignee of the present application (see, for example, the specification of Japanese patent application No. 58-62750 and so on).

The pair of color difference signals R−Y and B−Y whose dropout is compensated for are supplied to an encoder 26 and thereby converted to a chrominance signal C. This chrominance signal C and the above mentioned luminance signal Y are supplied to a composer or synthesizer 27 so that a video signal $S_V$ of the signal format according to the standard system is developed at a terminal 28 led out therefrom.

A pair of color difference signals R−Y and B−Y shown in FIGS. 3I and 3J are the output signals derived from the delay circuits 21 and 23, respectively.

By the way, in the recording and reproducing apparatus constructed as mentioned above, when the dropout is compensated for by the manner described above, the dropout pulse DO is once time-base-expanded and then the dropout is compensated for by using such dropout pulse DO. This requires the reproducing system 10P to have the time base expander 18 for the dropout pulse in addition to the time base expander 15 for the color difference signals. When a charge transfer element such as a CCD (charge coupled device) is used as the time base expanders 15 and 18, at least two CCDs must be prepared for one pair of color difference signals R−Y and B−Y, thus to increase the circuit scale.

Further, the timing at which the dropout should be compensated for must be controlled accurately, otherwise the dropout compensation can not be carried out at the correct position. This makes a read clock control system for the time base expander 18 complicated in construction.

OBJECTS AND SUMMARY OF THE INVENTION

Accordingly, it is an object of this invention to provide a video signal reproducing apparatus of a simple arrangement which can compensate for a dropout.

Another object of this invention is to provide a video signal reproducing apparatus which can reduce the circuit scale.

Yet another object of this invention is to provide a video signal reproducing apparatus which can compensate for a signal in a dropout interval without using a time base expander for a dropout pulse and hence without using an expensive control system therefor so that this invention is very suitable for practical use.

A further object of this invention is to provide a video signal reproducing apparatus capable of preventing the change of hue from being made conspicuous due to the signal compensation and which can improve the quality of picture image.

A yet further object of this invention is to provide a video signal reproducing apparatus which is particularly suitable in the application of a portable type recording and reproducing apparatus.

In order to solve the above mentioned problems, according to the present invention, in the stage of the time-base-compressed color difference signal with the time base compressed, the dropout pulse is superimposed upon the time-base-compressed color difference signal. To this end, an adder for the dropout pulse is provided in the stage prior to the time base expander.

After the dropout pulse is time-base-expanded, it is again detected from the pair of color difference signals R−Y and B−Y. Since the time base of this dropout pulse DO was already expanded to the original time base, this dropout pulse is directly supplied to a pair of switching circuits.

Consequently, since in the former dropout detector circuit, the dropout of the time-base-compressed color difference signal is detected under the state that the time base thereof is compressed, the time base of this dropout pulse is also compressed. Accordingly, if this dropout pulse and the time-base-compressed color difference signal are time-base-expanded simultaneously, the time base expander for time-base-expanding the dropout pulse becomes unnecessary and the clock control system therefor also becomes unnecessary.

These and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIGS. 5A to 5K are respectively diagrams useful for explaining the operation of the video signal reproducing apparatus shown in FIG. 4.

DESCRIPTION OF THE PREFERRED EMBODIMENT

Figure 1A:
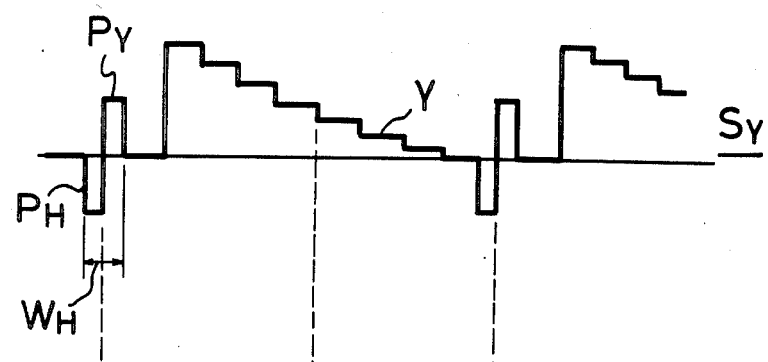
FIGS. 1A and 1B are respectively diagrams useful for explaining the present invention.
Figure 1B:
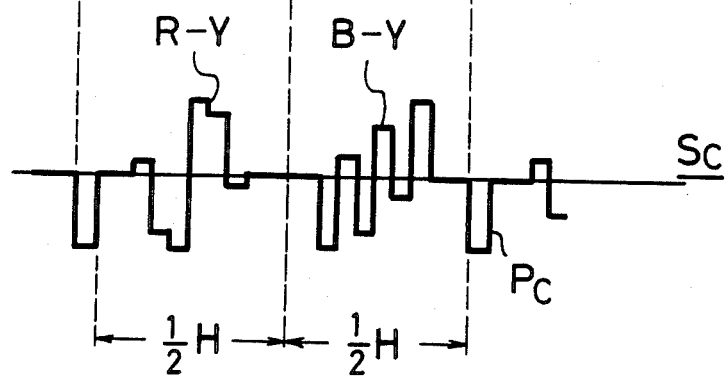
Figure 2:
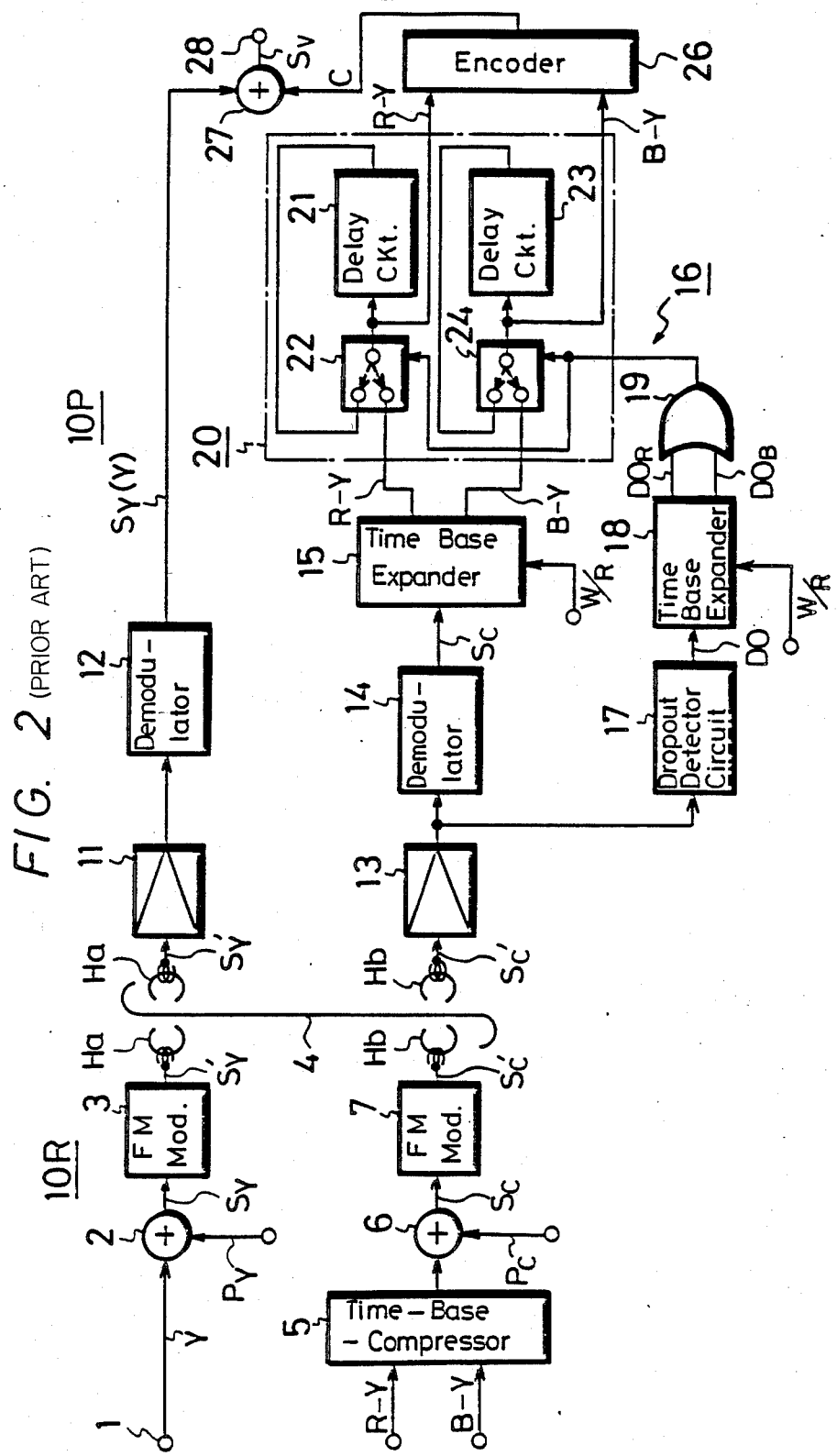
FIG. 2 is a block diagram of an example of a prior art recording and reproducing apparatus including a reproducing system.
Figure 3:
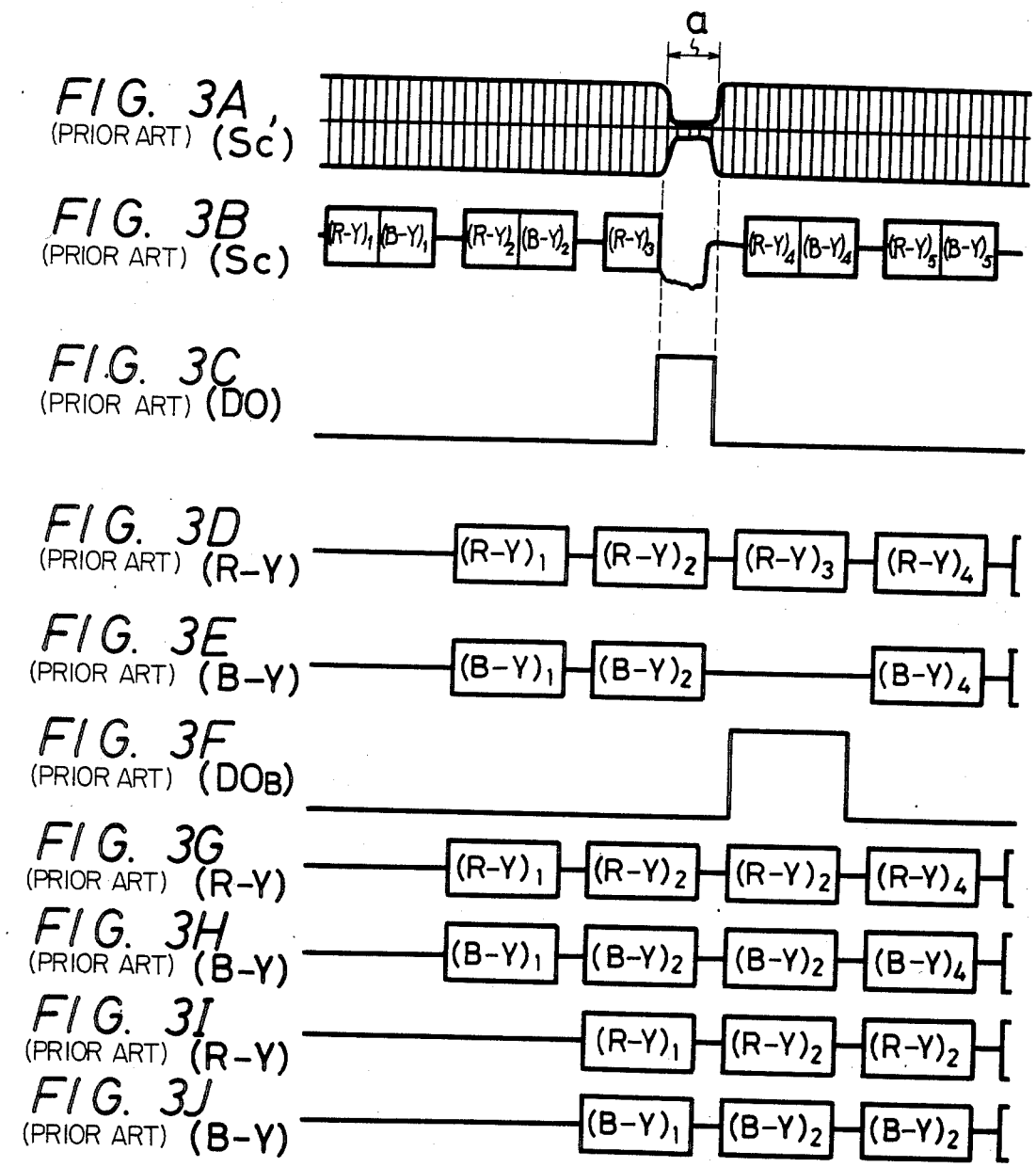
FIGS. 3A to 3J are respectively diagrams useful for explaining the operation of the recording and reproducing apparatus of FIG. 2.
Figure 4:
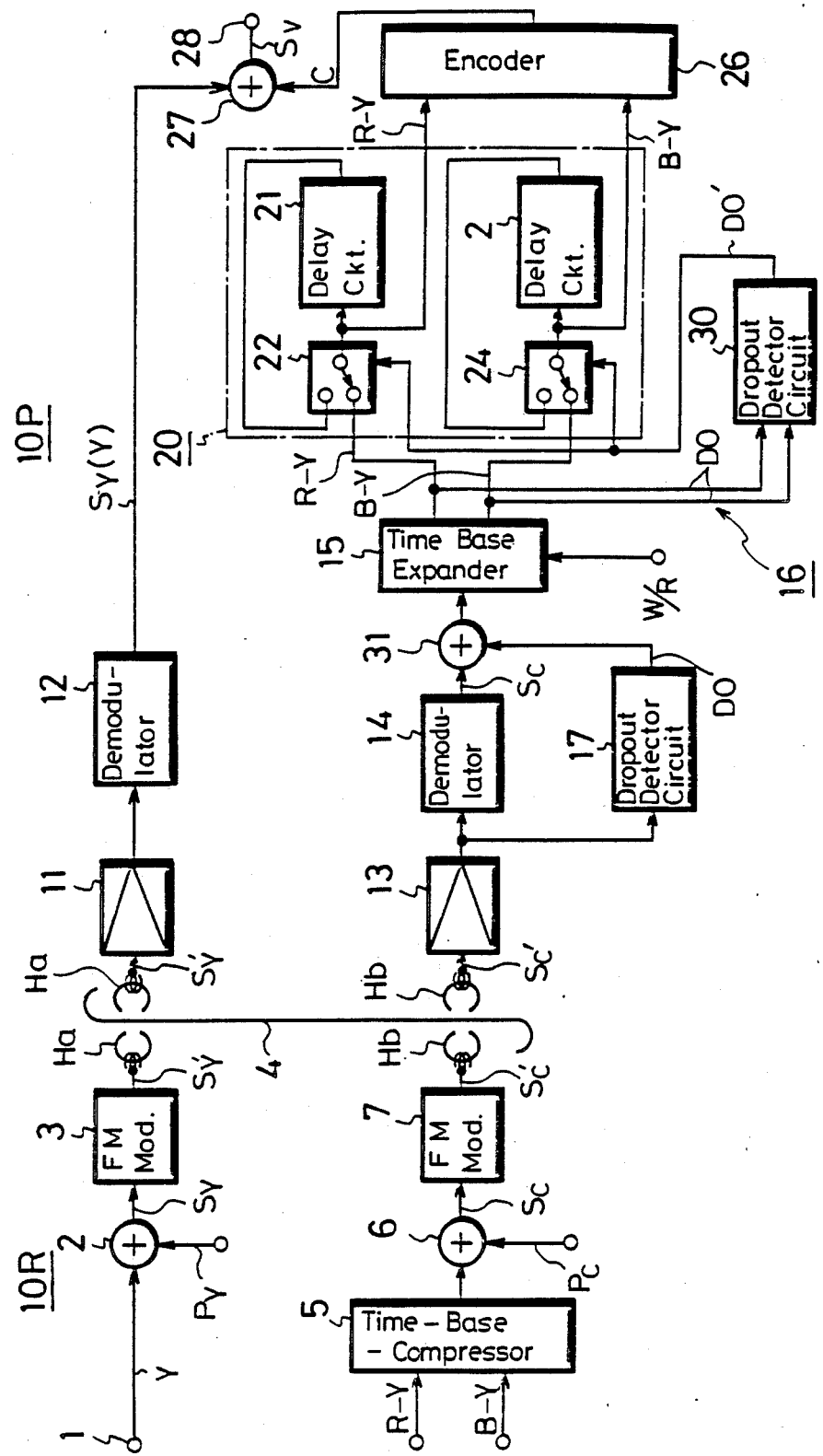
FIG. 4 is a block diagram showing an embodiment of a video signal reproducing apparatus according to this invention.

Now, an embodiment of a video signal reproducing apparatus according to this invention will hereinafter be described with reference to FIG. 4 and the followings. In FIG. 4 and the followings, like parts corresponding to those of FIGS. 2 and 3 are marked with the same references and will not be described in detail. In this case, the present invention is applied to a recording and reproducing apparatus in which a pair of color difference signals are time-base-compressed and then recorded together with the luminance signal on the recording track adjacent to the recording track of the luminance signal, simultaneously as described above.

Referring to FIG. 4, a signal adder 31 is provided at the stage prior to the time base expander 15 and the dropout pulse DO derived from the first dropout detector circuit 17 is supplied to the adder 31.

The pair of color difference signals R−Y and B−Y derived from the time base expander 15 are fed to a second dropout detector circuit 30, in which a time-base-expanded dropout pulse DO' is detected from the pair of time-base-expanded color difference signals R−Y and B−Y. This dropout pulse DO' is supplied commonly to the switching circuits 22 and 24 that are provided within the signal compensator circuit 20.

The operation of this circuit arrangement shown in FIG. 4 will be described with reference to FIGS. 5A to 5K.

The compressed color difference signal Sc' (FIG. 5A) reproduced by the head Hb is frequency-demodulated by the demodulator 14 and thereby produced is the compressed color difference signal Sc shown in FIG. 5B. The compressed color difference signal Sc' is fed through the amplifier 13 to the first dropout detector circuit 17 in which the dropout thereof is detected. When a dropout occurs in the interval a shown in FIG. 5A, the demodulated level of the compressed color signal Sc is lowered considerably as compared with the signal level as shown in FIG. 5B so that in response to the interval a, the dropout pulse DO shown in FIG. 5C is detected.

This dropout pulse DO is added to the compressed color difference signal Sc that was frequency-modulated at the adder 31. The position at which the dropout pulse DO is added to the signal Sc is synchronized with the interval a where the dropout occurs. Since this dropout pulse DO has an output level sufficiently higher than the compressed color difference signal Sc frequency-demodulated, the compressed color difference signal Sc delivered from the adder 31 becomes as shown in FIG. 5D. The compressed color difference signal Sc added with the dropout pulse DO is simultaneously time-base-expanded to have the original time base by the time base expander 15 at the next stage so that the pair of color difference signals R−Y and B−Y are delivered from the time base expander 15 in such a manner that as shown in FIGS. 5E and 5F, the dropout pulse DO is superimposed only upon the blue color difference signal B−Y corresponding to the interval a in which the dropout occurred.

When the pair of color difference signals R−Y and B−Y are supplied to the second dropout detector circuit 30, the dropout pulse DO' shown in FIG. 5G is detected by a level detector (not shown) provided within the dropout detector circuit 30. By this dropout pulse DO', the pair of switching circuits 22 and 24 are connected in the positions opposite to the illustrated positions, whereby color difference signals R−Y and B−Y 1H preceding as shown in FIGS. 5H and 5I are delivered only during the interval a to thereby carry out the compensation of the signal (FIGS. 5J and 5K).

According to the present invention as set forth above, since the time base of the compressed color difference signal Sc and that of the dropout pulse DO are expanded together, the time base expander for the dropout pulse is not required unlike the prior art so that the circuit scale can be reduced.

According to the circuit arrangement as mentioned above, since the control system for the time base expander becomes unnecessary, it is possible to compensate for the signal in the dropout interval a without using the expensive control system. This is very convenient for a practical use.

Needless to say, when a dropout occurs, during the dropout interval a, the pair of color difference signals are compensated for by the color difference signals 1H preceding so that the change of the hue due to the signal compensation can be prevented from being made conspicuous, thus to improve the quality of picture.

Accordingly, this invention is very suitable for being applied to a recording and reproducing apparatus in which a pair of component chrominance signals are time-base-compressed and recorded together with a luminance signal on the recording tack adjacent to the recording track for the luminance signal, and particularly to a recording and reproducing apparatus of a portable type.

The above description is given on a single preferred embodiment of the invention but it will be apparent that many modifications and variations could be effected by one skilled in the art without departing from the spirits or scope of the novel concepts of the invention so that the scope of the invention should be determined by the appended claims only.

We claim as our invention:

1. Apparatus for reproducing a video signal in which a plurality of component signals having initial time bases and forming said video signal have been time-base-compressed, modulated and then recorded on a recording medium and the video signal is reproduced from the recorded time-based-compressed component signals comprising:

reading means for reading said time-base-compressed component signals out from said recording medium;

demodulating means for demodulating the read-out time-base-compressed component signals to provide demodulated time-base-compressed component signals;

dropout detecting means for detecting a dropout of said read-out time-base-compressed component signal and producing a dropout signal;

adding means for superimposing said dropout signal upon said demodulated time-base-compressed component signals;

time-base-expanding means for expanding time bases of said time-base-compressed component signals and a time base of said superimposed dropout signal and producing a plurality of time-base-expanded component signals the time bases of which are expanded by a factor suitable to make the expanded time bases equal to said initial time bases and a time-base-expanded dropout signal whose time base has also been expanded by said factor;

dropout signal detecting means for detecting said time-base-expanded dropout signal in said time-base-expanded component signals;

signal compensating means for replacing said time-base-expanded component signals by preceding time-base-expanded component signals and passing the same when said dropout signal is detected by said dropout signal detecting means and passing said time-base-expanded component signals otherwise; and signal processing means for obtaining a reproduced video signal from the component signals passed through said signal compensating means.

2. The apparatus according to claim 1, in which said dropout signal has a higher level than said demodulated time-base-compressed component signals and in which said dropout signal detecting means includes level comparing means to detect said time-base-expanded dropout signal having a higher level than said time-base-expanded component signals.

3. The apparatus according to claim 1, in which said signal compensating means includes memory means for temporarily storing said time-base-expanded component signals derived from said time-base-expanding means to constitute said preceding time-base-expanded component signals, and switching means for selectively supplying one of said preceding time-base-expanded component signals from said memory means and said time-base-expanded component signals from said time-base-expanding means, said switching means being responsive to said dropout signal detected by said dropout signal detecting means to supply said preceding time-base-expanded component signals from said memory means to said signal processing means.

4. The apparatus according to claim 1, in which when said dropout detecting means detects a dropout in one of said time-base-compressed component signals, said dropout detecting means produces said dropout signals having a duration equal to that of said one time-base-compressed component signal, and said dropout signal is added by said adding means to said one time-base-compressed component signal at a portion where said dropout occurs, and in which after said one time-base-compressed component signal and said dropout signal are time-base-expanded, when said dropout signal is detected, a signal portion corresponding to said time-base expanded dropout signal is replaced with said preceding time-base-expanded component signal which is time-base-expanded to have a duration equal to that of said time-base-expanded component signal whose time base is expanded to be equal to said initial time base in said signal compensating means.

5. Apparatus for reproducing a video signal in which a luminance signal forming a video signal has been recorded on a first recording track on a magnetic tape and two component chrominance signals of said video signal and having initial time bases have been respectively time-bases-compressed and ultimately recorded on a second recording track of said magnetic tape, and said video signal is reproduced from said magnetic tape, comprising:

first reading means for reading said luminance signal from first recording track;

first demodulating means for demodulating the read-out luminance signal;

second reading means for reading said two component chrominance signals from said second recording track;

second demodulating means for demodulating the two read-out component chrominance signals to provide two demodulated component chrominance signals;

dropout detecting means for detecting a dropout of said two read-out component chrominance signals and producing a dropout signal;

adding means for superimposing said dropout signal upon said two demodulated component chrominance signals;

time-base-expanding means for time-base-expanding said two component chrominance signals and said superimposed dropout signal and producing two time-base-expanded component chrominance signals the time bases of which are expanded by a factor suitable to make the expanded time bases equal to said initial time bases, and a time-base-expanded dropout signal whose time base is also expanded by said factor;

dropout signal detecting means for detecting said time-base-expanded dropout signal in said two time-base-expanded component chrominance signals;

signal compensating means for replacing said two time-base-expanded component chrominance signals with two preceding time-base-expanded component chrominace signals and passing the same when said dropout signal is detected by said dropout signal detecting means and for otherwise passing said time-base-expanded component chrominace signals first signal processing means for obtaining a chrominance signal from the two component chrominance signals passed through said signal compensating means; and second signal processing means for obtaining a reproduced video signal from said chrominance signal and said luminance signal derived from said first demodulated means.

* * * * *